US 6,626,517 B2

(12) United States Patent
Iwasaki et al.

(10) Patent No.: US 6,626,517 B2
(45) Date of Patent: Sep. 30, 2003

(54) PRINTING APPARATUS AND PRINTING METHOD

(75) Inventors: Osamu Iwasaki, Tokyo (JP); Naoji Otsuka, Kanagawa (JP); Kiichiro Takahashi, Kanagawa (JP); Minoru Teshigawara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 10/058,939

(22) Filed: Jan. 30, 2002

(65) Prior Publication Data

US 2002/0175961 A1 Nov. 28, 2002

(30) Foreign Application Priority Data

Jan. 31, 2001 (JP) ........................................ 2001-024547

(51) Int. Cl.$^7$ ................................................. B41J 2/15
(52) U.S. Cl. ...................................................... 347/40
(58) Field of Search ................................ 347/40, 20, 1, 347/7, 6, 5, 68, 95, 48, 98, 84–86, 13; 399/72, 38, 9, 110

(56) References Cited

U.S. PATENT DOCUMENTS 5,818,474 A 10/1998 Takahashi et al.
6,042,212 A 3/2000 Otsuka et al.
6,142,598 A 11/2000 Iwasaki et al.
6,174,037 B1 1/2001 Donahue et al.

FOREIGN PATENT DOCUMENTS

| EP | 0632405 | 1/1995 |
| EP | 1080919 | 3/2001 |
| JP | 7-52390 | 2/1995 |

Primary Examiner—Raquel Yvette Gordon
(74) Attorney, Agent, or Firm—Fitzpatrick, Cella, Harper & Scinto

(57) ABSTRACT

To reduce the number of simultaneously driven printing elements so that the instantaneously flowing current is restricted in a printing system for completing an image by repeating the printing scan a plurality of times in the same printing area while applying random mask thereto. For this purpose, a mask of a predetermined size is structured as a thinning pattern in which data are arranged randomly, the data being for determining whether or not the respective ink ejection openings in a printing head are to be driven when the printing head repeats the scan a plurality of times in the same printing area of a printing medium. When forming an image, the printing elements concerned with the printing operation in the same printing area are divided into a plurality of sections, and the thinning patterns complementary to each other are applied to the respective sections during the respective printing scans.

12 Claims, 12 Drawing Sheets

PRINTING APPARATUS AND PRINTING METHOD

This application is based on Patent Application No. 2001-24547 filed Jan. 31, 2001 in Japan the content of which is incorporated hereinto by reference.

BACKGROUND OF THE INVENTION

1. Field of the Invention

The present invention relates to a printing apparatus and a printing method of a so-called multi-path printing system in which the same printing area on a printing medium is repeatedly scanned by a printing head to complete an image on the printing medium.

2. Description of the Related Art

Recently, printers of various printing systems have been developed due to the spread of personal computers, word processors or facsimile receivers in offices or homes. Of them, printers of an ink jet system are most suitable for a personal use in home or the office because they have various advantages such as easy in color correspondence, low in operation noise, high in printing grade for various media or small in size.

Of them, an ink jet printing apparatus of a serial scanning type in which the printing operation is carried out while a printing head reciprocates on a printing medium has been widely spread in the market because a high grade image is obtainable at a lower cost.

To obtain a high grade printed image, it is desirable that positions, sizes and shapes of dots formed by a plurality of printing elements in a printing head are uniform. If characteristics of the dots printed by the plurality of printing elements has an irregular distribution or deviation, it appears as the irregularity of density in the obtained image.

The present applicant has proposed in Japanese Patent Application Laid-open No. 7-52390 (1995) a system in which the same printing area on a printing medium is repeatedly scanned by a printing head to complete an image while a random mask pattern is applied as a thinning pattern in the respective scan to the printing data in the same printing area.

By using a mask made by using random numbers, this system causes the periodicity in the irregularity of density to be difficult to be visually recognized, as well as prevents the printed pattern from being synchronized with the thinned-out pattern.

On the other hand, in a recent ink jet printing head, printing elements (ink ejection openings in this case) are densely arranged in a wider range (printing width) for obtaining a high quality printed image at a high speed.

When such a printing head is used, however, the number of printing elements simultaneously actuated during the printing operation increases, as a total number of the printing elements increases. While an average current value used for the printing head can be reduced by using the randomly thinned-out mask pattern described above in comparison with a case wherein an image is completed by only one printing scan, there may be a random mask having a structure in that numerous printing elements are simultaneously driven to instantaneously require a large current.

If the instantaneous current value is large, problems may occur in that the manufacturing cost increases due to a structure for reducing a resistance of a path for applying a voltage to the printing head or for reducing noises.

SUMMARY OF THE INVENTION

The present invention has been made in view of the above-mentioned problems, and an object thereof is to reduce in a multi-path printing system the number of printing elements driven simultaneously so that a current instantaneously flowing into the printing head is restricted.

In an aspect of the present invention, there is provided a printing apparatus using a printing head on which a plurality of printing elements are arranged, scanning the printing head in a direction different from the arranging direction of the plurality of printing elements relative to a printing medium, and forming an image on the same printing area on the printing medium by a plural times of the scans of the printing head, the apparatus comprising:

means for providing thinning patterns for the plural times of the scan, the thinning patterns being for determining whether or not each of the printing elements concerned with a printing operation in the same printing area is to be driven, and the thinning patterns being complementary to each other, and means for applying the thinning patterns complementary to each other in relation to the printing elements which are simultaneously driven when the printing operation is carried out in the same printing area.

In another aspect of the present invention, there is provided a printing method using a printing head on which a plurality of printing elements are arranged, scanning the printing head in a direction different from the arranging direction of the plurality of printing elements relative to a printing medium, and forming an image on the same printing area on the printing medium by a plural times of the scans of the printing head, the method comprising the steps of:

providing thinning patterns for the plural times of the scan, the thinning patterns for determining whether or not each of the printing elements concerned with a printing operation in the same printing area is to be driven, and the thinning patterns being complementary to each other, and applying the thinning patterns complementary to each other in relation to the printing elements which are simultaneously driven when the printing operation is carried out in the same printing area.

In the apparatus or the method according to the present invention, the thinning pattern may be a mask of a predetermined size in which data for determining whether or not the printing element is to be driven are arranged randomly.

Further, means for or a step of relatively conveying the printing medium in a direction perpendicular to the scanning direction between the scans by an amount less than the arrangement width of the plurality of printing elements may be comprised.

The printing elements concerned with the printing operation carried out in the same printing area may be used while being divided into a plurality of sections, and the applying means or step may apply the thinning patterns to the plurality of sections during each of the plural times of the scans, and may apply the thinning patterns complementary to each other to the respective sections during the plural times of the scans.

The printing head may be a head for performing printing by ejecting an ink.

Here, the printing head has heating elements or electro-thermal transducers for generating thermal energy to make the ink to film-boil, as an energy for ejecting the ink.

The above and other objects, effects, features and advantages of the present invention will become more apparent from the following description of embodiments thereof taken in conjunction with the accompanying drawings.

Incidentally, hereafter, the wording "print" (hereinafter, referred to as "record" also) represents not only forming of significant information, such as characters, graphic image or the like but also represent to form image, patterns and the like on the printing medium irrespective whether it is significant or not and whether the formed image elicited to be visually perceptible or not, in broad sense, and further includes the case where the medium is processed.

The wording "printing medium" represents not only paper to typically used in the printing apparatus but also cloth, plastic film, metal plate and the like and any substance which can accept the ink in broad sense.

Furthermore, the wording "ink" has to be understood in broad sense similarly to the definition of "print" and should include any liquid to be used for formation of images, designs, patterns and the like or for processing of the printing medium.

Still further, the wording "nozzle", as far as not mentioned specifically, represents to an ejection opening, a liquid passage communicated with the opening and an element for generating an energy used for ink, in summary.

DETAILED DESCRIPTION OF PREFERRED EMBODIMENTS

The preferred embodiments of the present invention will be described in detail below with reference to the attached drawings.
(Embodiment of Printer Structure)

Figure 1:
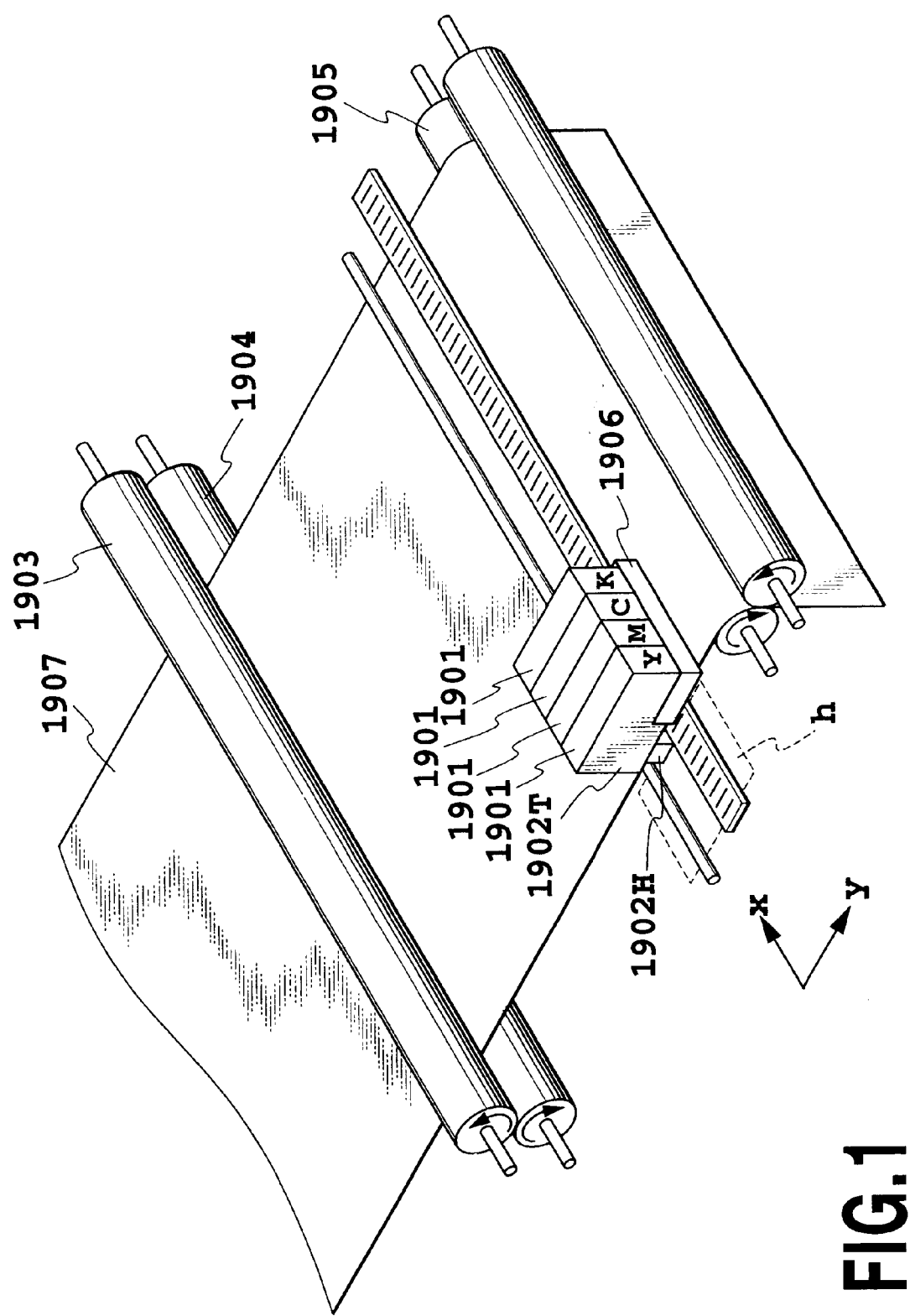
FIG. 1 is a schematic perspective view of an ink jet printer for carrying out the printing operation by using a plurality of nozzles, as one embodiment to which the present invention is applied.

FIG. 1 schematically illustrates an embodiment of an ink jet printer for carrying out the printing operation by using a plurality of nozzles. In this drawing, reference numeral 1901 denotes head cartridges provided in correspondence to inks, for example, of four colors; black (K), cyan (C), magenta (M) and yellow (Y). Each of the head cartridges 1901 includes an ink tank 1902T filled with either one of these color inks and a printing head 1902H in which are arranged a number of ejection openings capable of ejecting the ink supplied from the ink tank onto a printing medium.

Reference numeral 1903 denotes a paper-feeding roller (a feed roller) rotating in the arrow direction shown in the drawing while nipping a printing medium (a recording paper) 1907 in cooperation with an auxiliary roller 1904 to convey the recording paper 1907 in the direction Y. Reference numeral 1905 denotes a pair of paper supply rollers for supplying the recording paper 1907 to a printing position while nipping the latter between the pair, also having a function for flatly holding the recording paper 1907 between the supply rollers and the feed rollers 1903, 1904.

Reference numeral 1906 denotes a carriage for supporting the four head cartridges 1901 and moving the same in a main scanning direction during the printing operation. When the printing is not performed or during an ink ejection performance recovery operation for the head unit 1902H, the carriage 1906 is set at a home position h indicated by a dotted line.

The carriage 1906 located at the home position h prior to initiating the printing operation begins to move in the direction X once a command is input for starting the printing operation and then, the printing heads 1902H ejects inks from a plurality of ejection openings provided therein to carry out the printing operation within a width D corresponding to the arrangement range of the ejection openings. And, when the printing operation has completed up to the X-directional end of the recording paper 1907, the carriage 1906 returns to the home position h in a case of the one-directional printing and carries out the printing operation again in the direction X. On the other hand, in the case of bi-directional printing, the printing operation is also carried out while the carriage moves in a −X direction toward the home position h. In either cases, after the one-directional printing operation (one scan) has completed and before the next printing operation begins, the paper-feeding roller 1903 rotates at a predetermined amount in the arrow direction shown in the drawing to convey the recording paper 1907 at a predetermined amount in the direction Y. By repeating the one scan printing operation and the predetermined width conveyance of the recording paper in the above-mentioned manner, the printing of data corresponding to one sheet of printing paper is completed.

Unlike a monochromatic printing that prints only characters such as letters, numbers and symbols, the color image printing must meet various requirements such as color development, grayscale characteristic and uniformity. As to the uniformity in particular, slight variations among individual nozzles that are produced during the manufacture of a multi-nozzle head formed integrally with many nozzles influence the amounts of ink ejected from the individual nozzles and the directions of ink ejection during printing and eventually degrade the image quality in the form of density variations of the printed image.

Accordingly, as a countermeasure for the density variations, a multi-path printing system is employed in which a conveyance amount of a printing medium after the completion of one scan is less than the nozzle arrangement width and the scanning is carried out while thinning out an amount of data in one scan and repeated a plurality of times in the same area.

Figure 2:
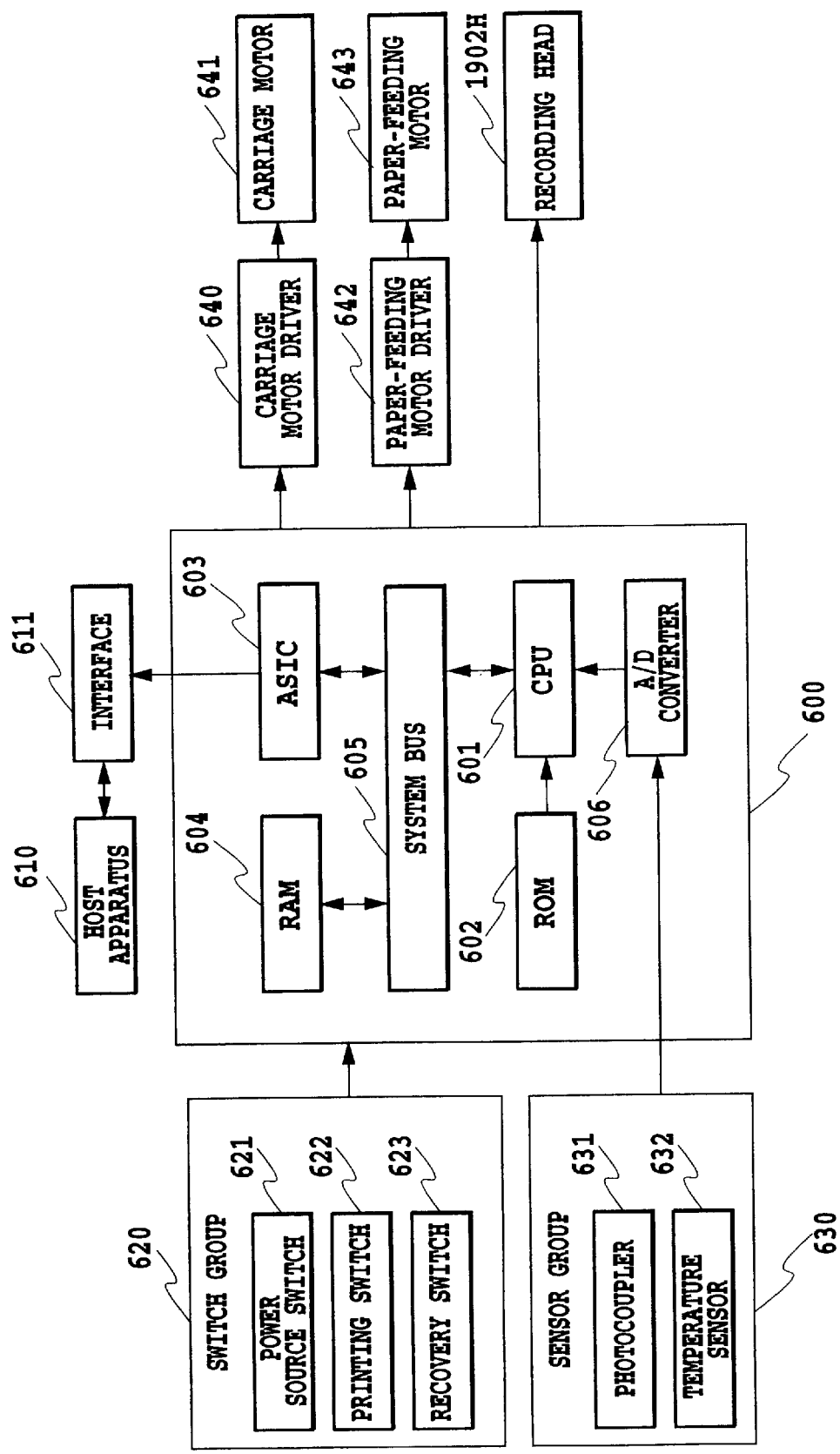
FIG. 2 is a block diagram generally illustrating a control system for the ink jet printer shown in FIG. 1.

FIG. 2 is a block diagram illustrating a schematic structure of a control system for the ink jet printer shown in FIG. 1.

In this drawing, reference numeral 600 denotes a controller constituted by CPU 601 in a microcomputer form, ROM 602 storing fixed data such as a program corresponding to a control sequence described later or necessary tables, application specific integrated circuits (ASIC) 603 for generating control signals for controlling a carriage motor, the paper feed motor, a printing head 650 or others described later, RAM 604 having an area for expanding image data, a working area or others, a system bus 605 for connecting CPU 601, ASIC 603 and RAM 604 with each other to transmit and receive data between them, and an A/D converter 606 for receiving analog signals from a group of sensors described later and converting them to digital signals which are then fed to CPU 601.

Reference numeral 610 denotes a host computer (or a reader or a digital camera for reading an image) as a supply source of image data and transmits/receives image data, commands or status signals to/from the controller 600 via an interface (I/F) 611.

Reference numeral 620 denotes a group of switches for receiving commands issued from the operator, including a power ON switch 612, a switch 622 for commanding the commencement of the printing operation and a recovery switch 623 for indicating the starting-up of the process for maintaining the ink ejection performance of the printing head in the desired state (recovery process). Reference numeral 630 denotes a group of sensors for detecting states of the apparatus, including a photo-coupler 631 for detecting the home position h and a temperature sensor 632 provided at a suitable position of the printer for detecting an environmental temperature.

Further, reference numeral 641 denotes a carriage motor constituting a drive source for causing the carriage 1906 to scan in the directions X and −X; 640 a driver therefor; 643 a paper feed motor constituting a drive source for feeding the printing medium 1907; and 642 a driver therefor.

(Embodiment of Printing Head Controller)

Figure 3:
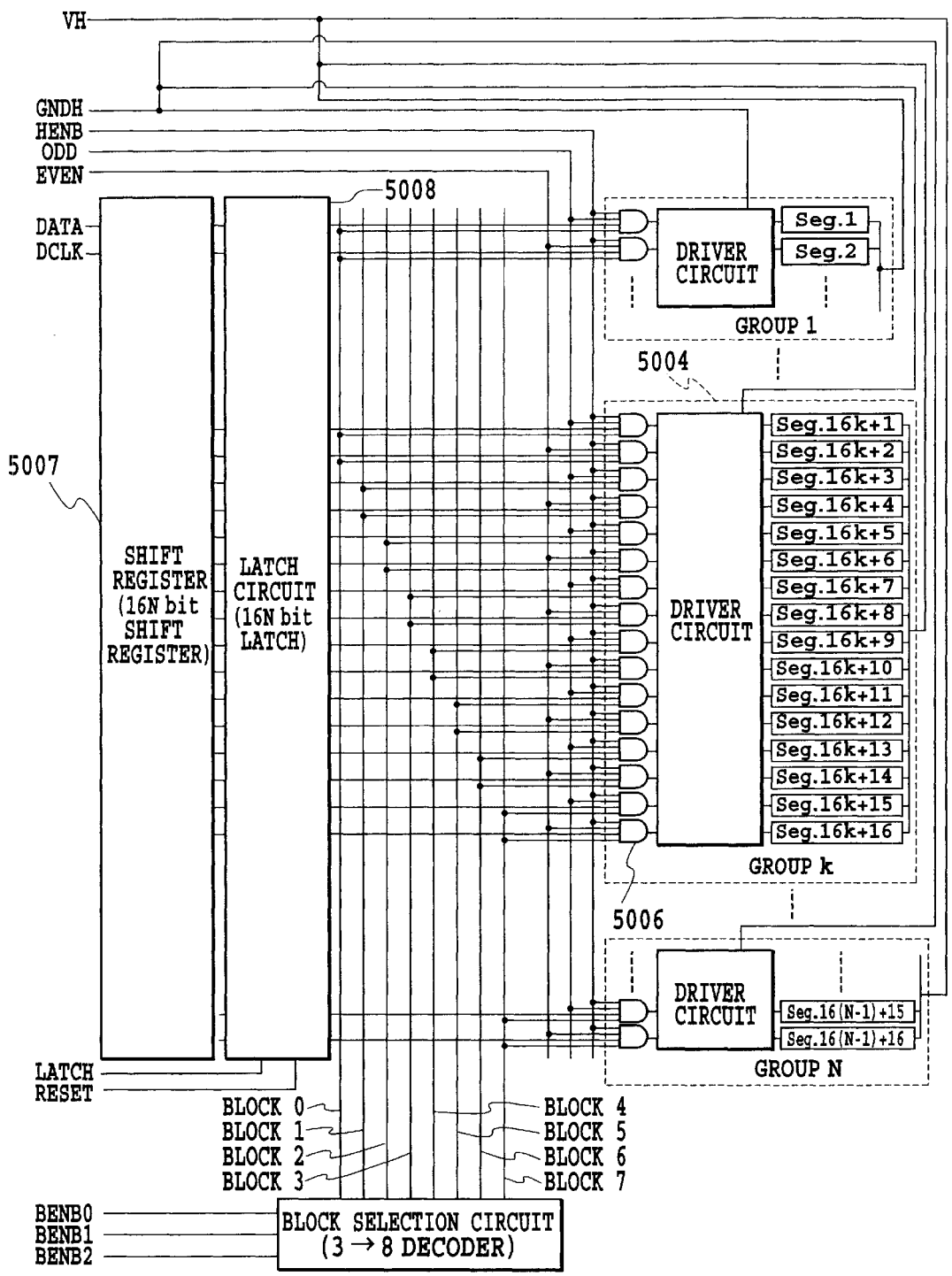
FIG. 3 is a block diagram illustrating a control circuit for a printing head used in the printing head shown in FIG. 1.

FIG. 3 is a block diagram illustrating a control circuit arranged on a printing head substrate on which electrothermal transducers to generate thermal energy for causing film boiling in ink as an energy for ejecting ink from the ejection openings are formed. Hereinafter, the substrate will be referred to as a heater board, while the electrothermal transducers will be referred to as an ejection heater.

In this control circuit, for example, printing elements (nozzles or ejection heaters) provided in the printing head 1902H are divided into N groups each including 16 elements from one end to the other of the arrangement range thereof to control the printing head so that the printing operation is carried out due to the block-division drive. Thus, the printing head is provided with 16×N printing elements.

The control circuit shown in FIG. 3 includes a 16×N bits-shift register (hereinafter merely referred to as a shift register) 5007, a 16×N bits-latch circuit (hereinafter merely referred to as a latch circuit) 5008, a block selection circuit 5005, and driver array circuits 5004 and AND circuits 5006 for the respective groups.

An image signal (DATA) and a clock signal (DCLK) are input from the driver circuit (the controller 600) in a main body of the printer to the shift register 5007. The shift register 5007 holds the image signals (DATA) serially input in synchronism with the clock signals (DCLK). The latch circuit 5008 latches the image signals (DATA) held in the shift register 5007 in correspondence to a latch signal (LATCH) when the latch signal (LATCH) is input from the driver circuit in the main body of the printer thereto. The latched image signals become signals for selecting nozzles to be used (hereinafter, the signals will be referred to nozzle selection signals).

Binary 3 bits parallel block selection signals (BENB0 to BENB2) are input from the driver circuit in the main body of the printer into the block selection circuit 5005. In accordance with combinations of the respective bits in these block selection signals BENB0 to BENB2, block indication signals (Block0 to Block7) for indicating either one of eight blocks are created and output into the AND circuit 5006. These block indication signals are wired to select the nozzles in the following manner if symbols are given to the respective nozzles or the ejection heaters as Seg.1, Seg.2, . . . starting from one end of the printing head:

| | | |
|---|---|---|
| Block0 | Seg.16k + 1, | Seg.16k + 2 |
| Block1 | Seg.16k + 3, | Seg.16k + 4 |
| Block2 | Seg.16k + 5, | Seg.16k + 6 |
| Block3 | Seg.16k + 7, | Seg.16k + 8 |
| Block4 | Seg.16k + 9, | Seg.16k + 10 |
| Block5 | Seg.16k + 11, | Seg.16k + 12 |
| Block6 | Seg.16k + 13, | Seg.16k + 14 |
| Block7 | Seg.16k + 15, | Seg.16k + 16 | wherein k is an integer in a range from 0 to N−1, while N is an integer greater than 1.

Further, a pulse signal (ODD) and a pulse signal (EVEN) (hereinafter these two signals are referred to as an even/odd selection signal) are supplied to the AND circuit 5006 to select the nozzles in the following manner:

| | |
|---|---|
| ODD | Seg.16k + (2m + 1) |
| EVEN | Seg.16k + (2m + 2) | wherein m is an integer in a range from 0 to 7.

Accordingly, by combining the block selection signal with the even/odd selection signal, it is possible to divide the group of nozzles into sixteen sub-blocks to select the nozzle.

Also, a heat pulse signal (HENB) is input from the driver circuit in the main body of the printer and supplied to the AND circuits 5006 to corresponds to all the nozzles.

Figure 4:
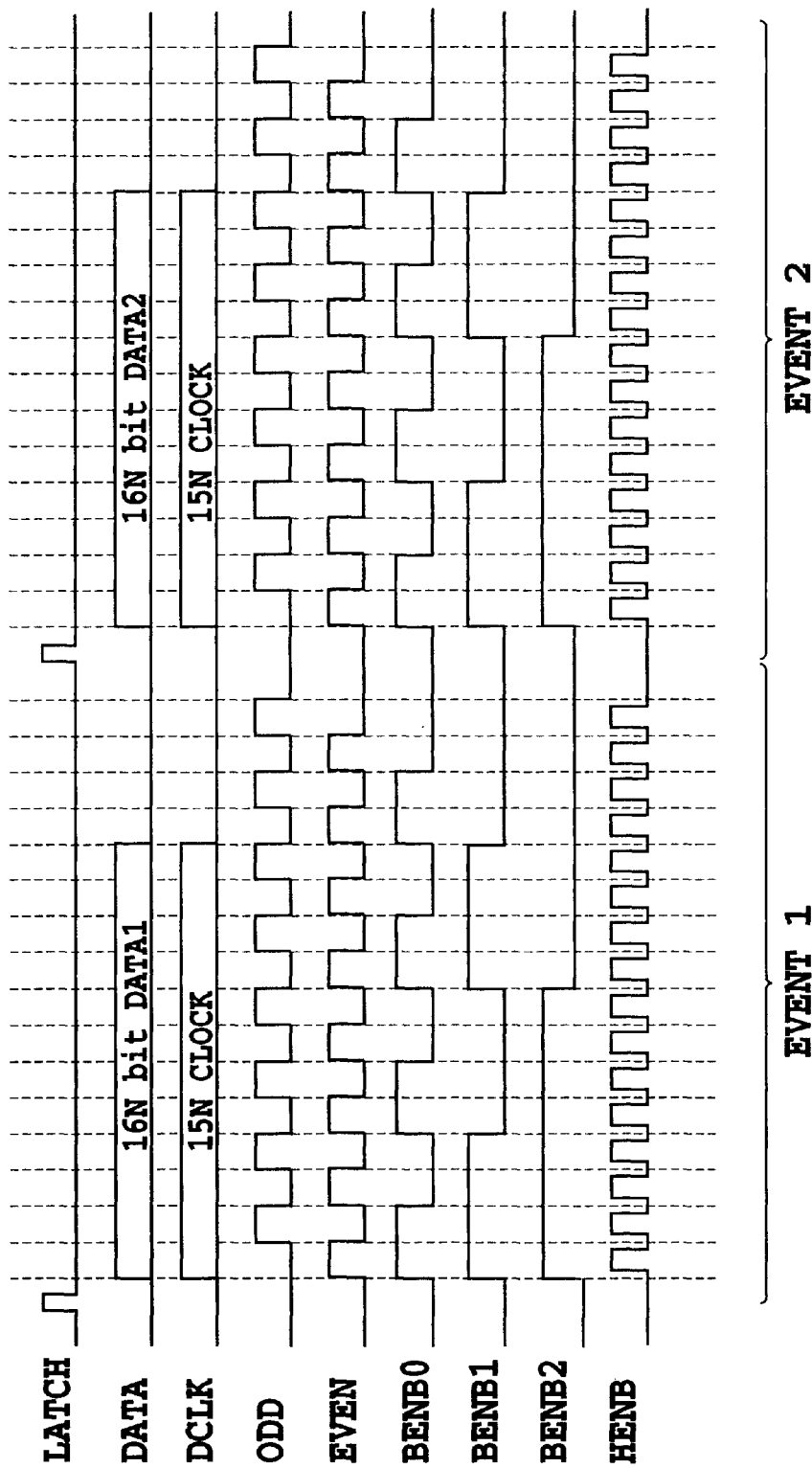
FIG. 4 is a time-chart of various signals fed from the controller shown in FIG. 2 to the control circuit shown in FIG. 3.

FIG. 4 is a time-chart for various signals fed from the driver circuit (controller 600) in the main body of the printer to the printer head 1902H. In this figure, signal wave corresponding to two periods of the printing operation are illustrated as indicated as EVENT 1 and EVENT 2.

As shown also in FIG. 4, the printing operation corresponding to one period is divided into sixteen blocks by the block selection signals (BENB 0 to BENB 2) and the even/odd signals (ODD and EVEN). Also the image signal (DATA) transferred in EVENT 1 becomes effective by the latch signal (LATCH) in EVENT 2.

In conclusion, nozzles to be driven are selected by the nozzle selection signal and the drive timing at which a group of nozzles is simultaneously driven is decided by the block selection signal and the even/odd selection signal. By imparting the pulse signal in synchronism with the block indication signal and the even/odd selection signal, the pulse wave applied to the respective ejection heater is controlled, and a voltage VH is applied to the ejection heater thus controlled via the driver array circuit 5004.

Figure 5:
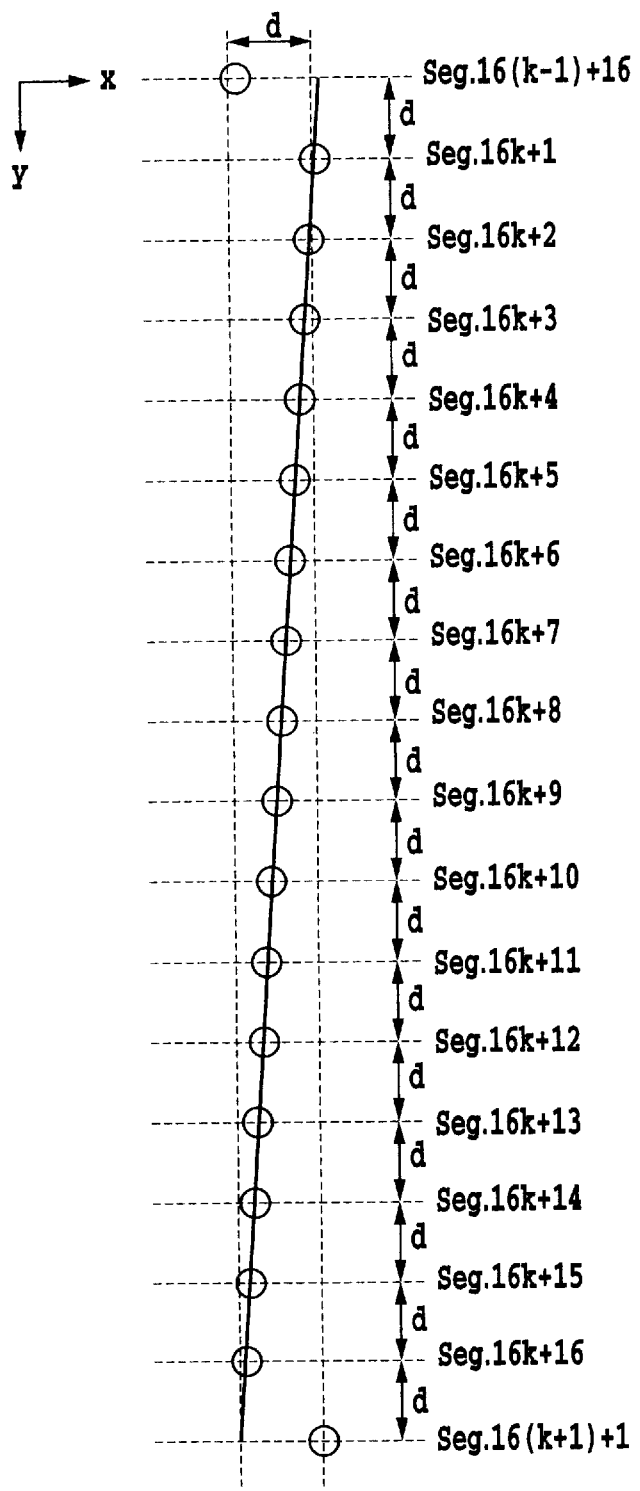
FIG. 5 illustrates the positional relationship of ejection openings arranged on the printing head in relation to a printing medium during the printing scan.

FIG. 5 illustrates the positional relationship of the ejection openings arranged in the printing head 1902H on the printing medium regarding the printing scan, wherein a horizontal direction of the drawing corresponds to a main scanning direction (the direction X in FIG. 1) and a vertical direction corresponds to a sub-scanning direction (the direction Y in FIG. 1).

The number of the respective ejection opening (segment number) corresponds to the nozzle number in the circuitry shown in FIG. 3. Regarding the sub-scanning direction, the respective ejection openings are arranged at a pitch d which is a distance between every adjacent pixels. Regarding the main scanning direction, the ejection openings (for example, Seg. 16k+1 wherein k is an integer in a range from 0 to N−1) belonging to the same block and simultaneously selected by the even/odd selection signal occupy the same position. Accordingly, the respective nozzles arranged at a pitch of sixteen pixels in the sub-scanning direction are driven at the same timing relative to the printing image.

The ejection openings in the respective groups are arranged in the main scanning direction at a pitch of d/16 within one pixel distance in correspondence to one printing operation period, while assuming the ejection opening belonging to BLOCK 0 as a reference.

By arranging the ejection openings as described above, it is possible to print a vertical line corresponding to one column on the printing medium if the nozzles belonging to BLOCK 0 to BLOCK 16 are sequentially driven in one printing operation period while causing the printing head 1902H to scan in the main scanning direction X.

(Embodiment of Random Mask Structure)

Figure 6:
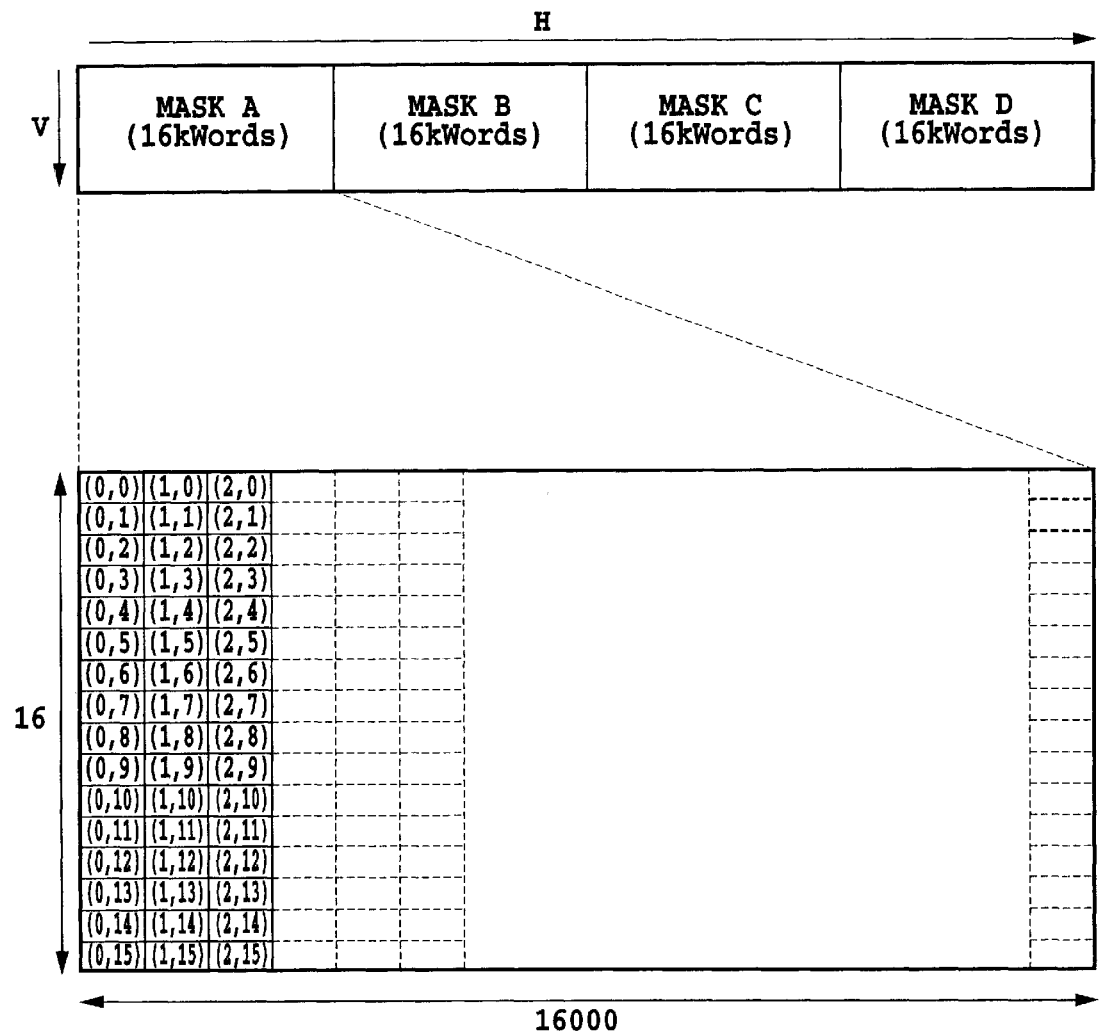
FIG. 6 illustrates a random mask applied to one embodiment of the present invention.

FIG. 6 illustrates an example of the structure of a mask applied when the printing of an image is completed by repeating the printing scan four times (four-path printing) in the same printing area; that is, by repeating one main scan (a printing scan) and the conveyance of the printing medium in the sub-scanning direction by ¼ of the ejection opening arrangement range.

The mask is constituted by four areas; MASK A, MASK B, MASK C and MASK D. As shown in the drawing, each of the MASK A, MASK B, MASK C and MASK D is constituted by 16 kWords (1 kWords=16000 bits) and each of the mask areas has a size of 16 bits in the vertical direction and 16000 bits in the horizontal direction. This relationship between the vertical and horizontal directions coincides with that between the directions X and Y in FIGS. 1 and 5.

Positions of pixels on the mask are managed while referring the vertical direction to V and the horizontal direction to H as shown by arrows in an upper half of FIG. 6. In this regard, it is possible to manage the respective mask areas by H values in the horizontal direction when the MASK A, MASK B, MASK C and MASK D are expanded as one series on the memory area. According to this management method, a top of MASK A is (H, V)=(0, 0), that of MASK B is (H, V)=(16000, 0), that of MASK C is (H, V)=(16000×2, 0), and that of MASK D is (H, V)=(16000×3, 0).

Figure 7A:
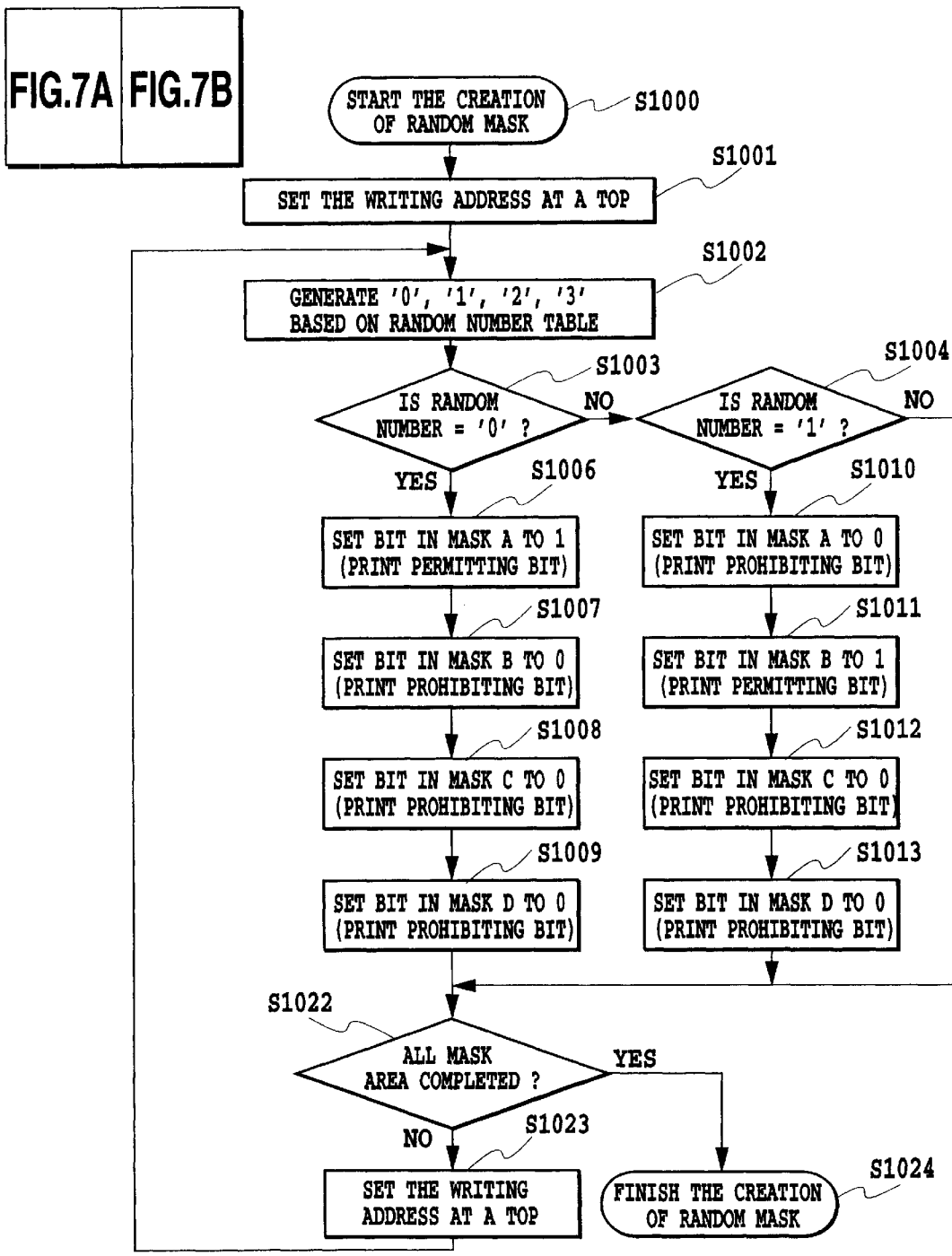
FIG. 7 is a diagram showing the relation between FIGS. 7A and 7B, FIGS. 7A and 7B being a flow chart illustrating the steps of forming the random mask applied to one embodiment of the present invention.
Figure 7B:
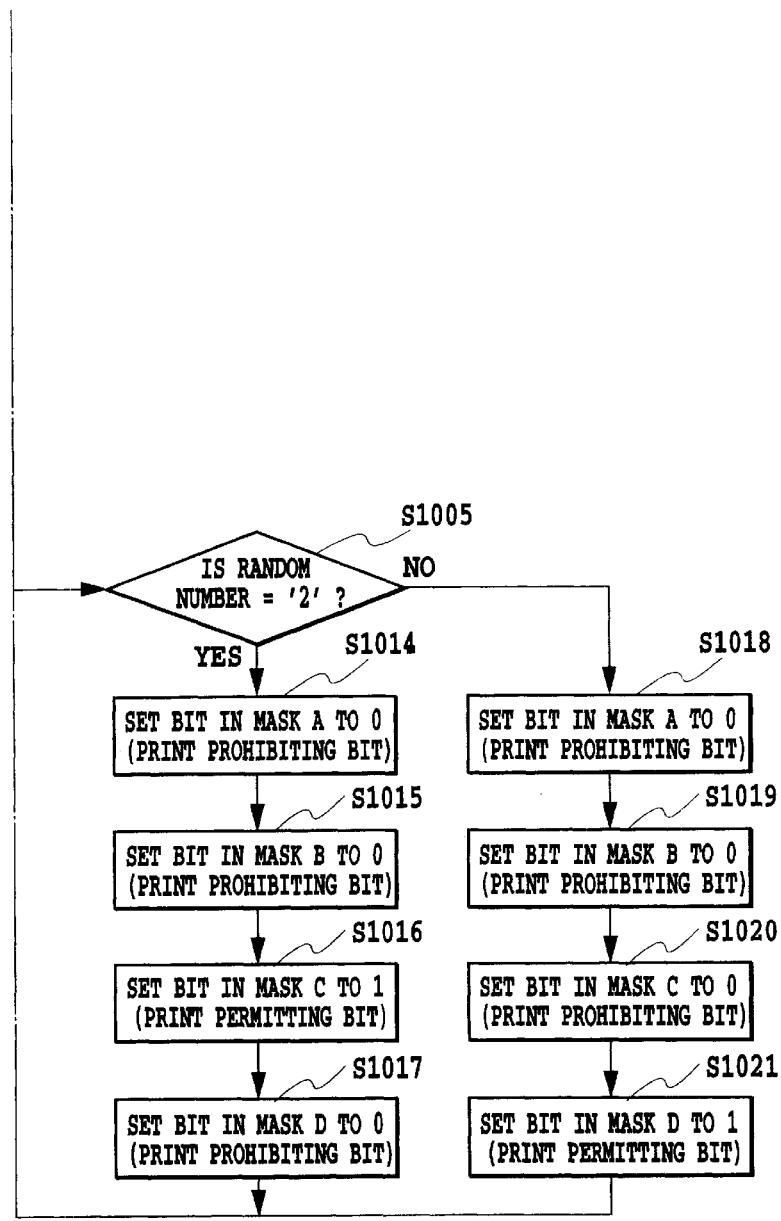

FIG. 7 is a diagram showing the relation between FIGS. 7A and 7B, FIGS. 7A and 7B being a flow chart illustrating a method for creating a random mask used for this embodiment.

First, the creation of the random mask is initiated at step S1000. Then a position at which the setting of the mask data is initiated is defined at a top of each of the mask areas at step S1001. That is, regarding MASK A, this position is (H, V)=(0, 0); regarding MASK B, (H, V)=(16000, 0); regarding MASK C, (H, V)=(16000×2, 0); and regarding MASK D, (H, V)=(16000×3, 0).

Then, at step S1002, random numbers consisting of '0', '1', '2' and '3' are generated. At the succeeding steps S1003, S1004 and S1005, a mask data for permitting or prohibiting dot printing is decided in accordance with values of the random number generated.

When the random number is '0', the answer is affirmative at step S1003, and the routine subsequently proceeds to steps S1006, S1007, S1008 and S1009. At step S1006, a bit corresponding to a present processing position in MASK A is set to '1', for setting this bit to a bit for permitting the printing of pixel in accordance with the image data (hereinafter referred to as a print permitting bit). At step S1007, a bit corresponding to a present processing position in MASK B is set to '0', for setting this bit to a bit for prohibiting the printing of pixel irrespective of the image data (hereinafter referred to as a print prohibiting bit). At steps S1008 and S1009, bits corresponding to present processing positions in MASK C and MASK D are set to '0', respectively, so that both of them are the print prohibiting bits. That is, according to the process series at steps S1006, S1007, S1008 and S1009, the pixel corresponding to the bit at the present processing position in MASK A becomes a pixel capable of being printed in accordance with the image data, and the others become print prohibiting pixels.

When the random number is '1', the answer is affirmative at step S1004, and the routine subsequently proceeds to steps S1010, S1011, S1012 and S1013. According to the process series at steps S1010, S1011, S1012 and S1013, a pixel corresponding to a bit at a present processing position in MASK B becomes a pixel capable of being printed in accordance with the image data, and the others become print prohibiting pixels.

When the random number is '2', the answer is affirmative at step S1005, and the routine subsequently proceeds to steps S1014, S1015, S1016 and S1017. According to the process series at steps S1014, S1015, S1016 and S1017, a pixel corresponding to a bit at a present processing position in MASK C becomes a pixel capable of being printed in accordance with the image data, and the others become print prohibiting pixels.

When the random number is '3', the answer is negative at any step S1003, S1004 and S1005, and the routine subsequently proceeds to steps S1018, S1019, S1020 and S1021. According to the process series at steps S1018, S1019, S1020 and S1021, a pixel corresponding to a bit at a present processing position in MASK D becomes a pixel capable of being printed in accordance with the image data, and the others become print prohibiting pixels.

After the mask data for one pixel have been set in the respective mask areas, the routine proceeds to step S1022 at which it is determined whether or not the mask data setting has completed all over the mask areas. That is, it is determined whether or not a position of a bit which is now processed is (H, V)=(15999, 15).

When it is determined at step S1022 that the mask data setting has not yet completed all over the mask areas, the routine proceeds to step S1023 at which position of bits in the respective mask areas to be processed in the next time are indicated. While this indication is basically carried out by the increment of +1 to the current value of the V coordinate, if the current value of the V coordinate is '16', '0' is set as the V coordinate as well as the current value of the respective H coordinates in MASK A, MASK B, MASK C and MASK D are incremental by +1.

After being processed at step S1023, the routine returns to step S1002 and the same process is repeated as described above on bits at indicated positions in the respective mask areas. When it is determined that the mask data setting has completed all over the mask areas at step S1022, the routine proceeds to step S1024 at which the creation of the random mask is finished.

The above-mentioned random mask creating process may be executed prior to the image printing, and by expanding the random mask thus obtained in the memory area of RAM

604, for example, it is possible to use the same when the subsequent image printing process is carried out. If it is desired to use the random mask once created for a long period, the mask may be stored in a non-volatile memory or others so that the contents thereof are preserved even if the power source of the printer is off. Further, instead of creating the random mask in the printer, it may be created in a host apparatus 610 such as a computer and supplied to the printer at a suitable time.

(Embodiment of Printing Control)

The above-mentioned random mask is structured to be settable in a printable area on the printing medium. In the coordinate of the printable area on the printing medium, the main scanning direction is referred to as H and the sub-scanning direction is referred to as V. Also, according to this embodiment, the image is completed by repeating the printing scan four times in the same printing area. The number of printing elements in the printing head is 16×16×c (c is an integer 1 or more) and the above-mentioned N value is N=16×c.

The main body of the printer analyzes the command of printing data transferred via the interface 611 and expands the same in RAM 602 as the image data to be printed. An expansion area of the image data (expansion buffer) is established in the memory area of RAM 602, wherein a horizontal size of the expansion buffer corresponds to the number of pixels Hp in the printable area in the main scanning direction and a vertical size corresponds to a quarter of the number of pixels 16×16×c (that is, 64×c pixels) in the vertical direction printed by one printing scan of the printing head. A memory area (printing buffer) on RAM 602 which is referred to when data is fed to the printing head during the printing scan is established in the memory area of RAM 602, wherein a horizontal size of the printing buffer corresponds to the number of pixels Hp in the printable area in the main scanning direction and a vertical size corresponds to the number of pixels 16×16×c in the vertical direction printed by one printing scan of the printing head.

ASIC 603 in the main body of the printer is capable of executing a function for indicating an H coordinate of a starting position of the mask area of the random mask in the horizontal direction of the printing buffer by a series of sixteen pixels consecutive in the vertical direction of the printing buffer as one unit. ASIC 603 is also capable of executing a function for returning the H coordinate to a top of the mask area when a final end of the random mask in the horizontal direction of the printing area has been reached. That is, H='0' to '15999' of the random mask in the horizontal direction are sequentially and repeatedly made to correspond to the printing area in the horizontal direction on which the MASK A shown in FIG. 6 is to be applied.

Based on the above-mentioned correspondence, ASIC 603 causes the position of the image data expanded in the printing buffer to correspond with the position of data in the random mask created as described above during the printing scan of the printing head and calculates a logical product (AND) of both the data while having direct access to the memory area of RAM 602, and then data for driving the printing element (ejection heater) is transferred to the printing head.

In this embodiment, since the image is printed by repeating the printing scan four times while conveying the printing medium at ¼ of the nozzle arrangement width in the sub-scanning direction between the respective times of the printing scan, once the respective printing scan of the printing head has finished, the image printing corresponding to ¼ of the vertical width of the printing head (the nozzle arrangement width in the sub-scanning direction) is completed. Accordingly, at a time when one printing scan of the printing head has finished, ¼ of the printing image data expanded in the printing buffer located on the downstream side in the conveying direction of the printing medium becomes unnecessary because the image corresponding thereto has already completed. Therefore, the area of the printing buffer in which data now becoming unnecessary has been stored may be used as an expansion buffer for expanding the next image data, and the memory area used as the expansion buffer may be used as a ¼ area of the printing buffer for expanding ¼ of data corresponding to the upstream side in the printing medium conveying direction. That is, the memory area of the expansion buffer and the printing buffer is managed so that ¼ of the width to be printed by the printing scan of the printing head is regarded as a unit area. And, while carrying out the suitable address management in these five areas to be managed, the expansion buffer and the four printing buffer areas are rotationally used.

Figure 8:
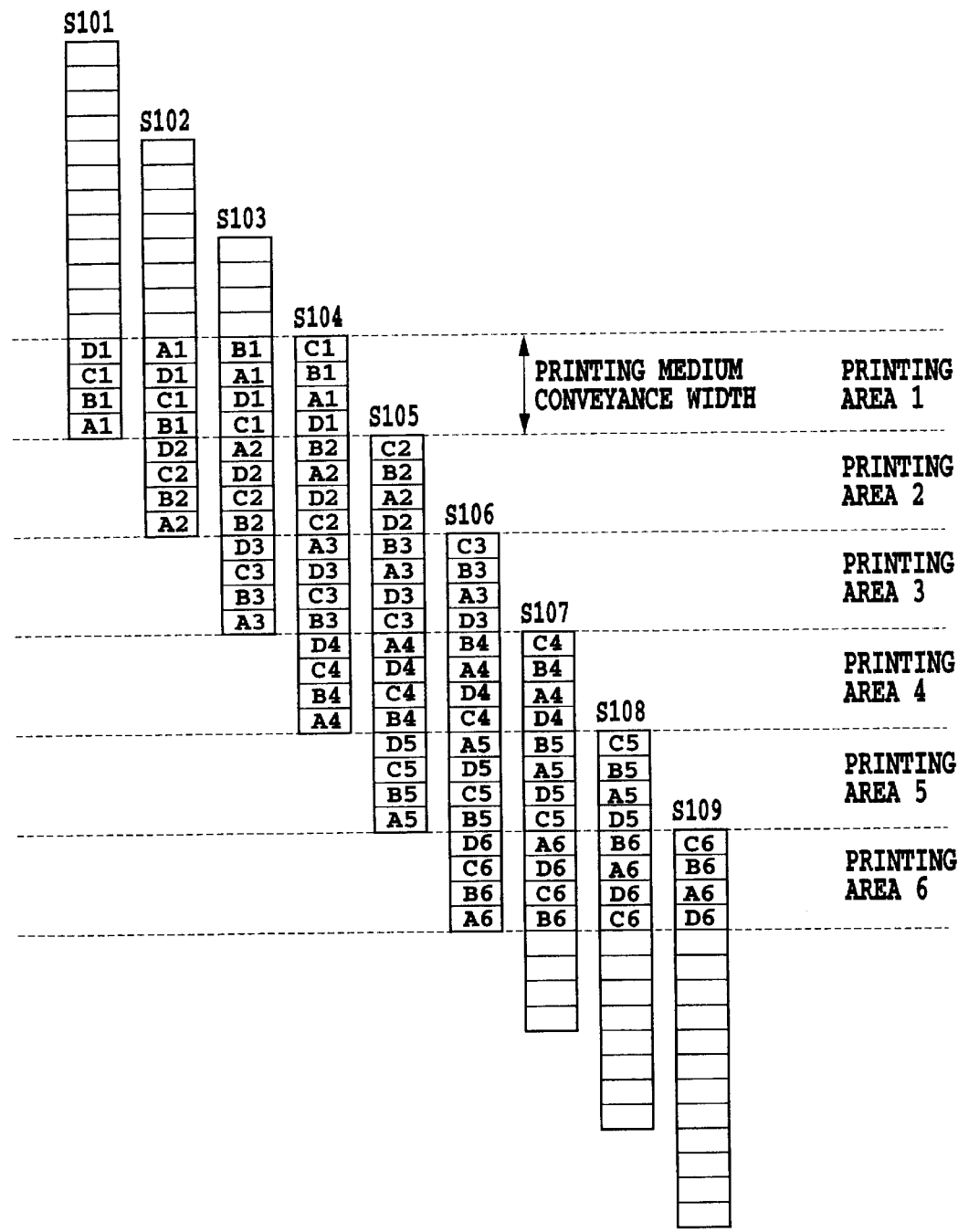
FIG. 8 illustrates the scanning operation of the printing head in a printing area and mask patterns used therefor in one embodiment of the present invention.

FIG. 8 illustrates the scanning operation of the printing head in the printing area and the mask pattern to be used in this embodiment.

In the drawing, a distance between the respective dotted lines represents a conveyance amount of the printing medium by one sub-scan. That is, according to this embodiment, the conveyance amount by one sub-scan after one printing scan (main scan) of the printing head is 64×c pixels, corresponding to ¼ of the vertical width of the printing head. In this regard, the printing head moves during the printing scan in the right/left direction of the drawing and the printing medium is conveyed in the upward direction of the drawing.

In the drawing, the numerical part of each of reference symbols A1, B1, C1, D1 or the like is a management number of an application starting point (bit) in a random mask applied to a corresponding printing area, and if this added numeral is the same, for example, as in MASK A and MASK B, the starting points are offset by 16000 pixels in the horizontal direction each other. The same relationship exists between MASK B and MASK C, and between MASK C and MASK D. In other words, while repeating the printing scan four times in the same printing area, MASK A, MASK B, MASK C and MASK D, each of which starting points offsets by 16000 pixels in the horizontal direction, are applied to complete the image in this area.

In FIG. 8, in a first printing scan S101, the printing head carries out the printing operation in PRINTING AREA 1 by using the printing elements corresponding to 64×c pixels from Seg. 16×12×c+1 to Seg. 16×16×c on the upstream side as seen in the conveyance direction of the printing medium. In this printing scan S101, PRINTING AREA 1 divided into four equal sections as seen in the sub-scanning direction, in each of which sections the starting point of the random mask is managed. As illustrated, the random mask (MASK A to MASK D) is applied to the printing elements (ejection heaters), by applying from the starting points (bits) in the following manner:

| | |
|---|---|
| From Seg.16 × 12 × c + 1 to Seg.16 × 13 × c | D1 |
| From Seg.16 × 13 × c + 1 to Seg.16 × 14 × c | C1 |
| From Seg.16 × 14 × c + 1 to Seg.16 × 15 × c | B1 |
| From Seg.16 × 15 × c + 1 to Seg.16 × 16 × c | A1 |

Next, after the printing medium is conveyed by 64×c pixels, a second printing scan S102 is carried out. In the second printing scan S102, the random mask (MASK A to MASK D) is applied to the printing elements (ejection heaters), by applying from the starting points (bits) in the following manner:

| | |
|---|---|
| From Seg.16 × 8 × c + 1 to Seg.16 × 9 × c | A1 |
| From Seg.16 × 9 × c + 1 to Seg.16 × 10 × c | D1 |
| From Seg.16 × 10 × c + 1 to Seg.16 × 11 × c | C1 |
| From Seg.16 × 11 × c + 1 to Seg.16 × 16 × c | B1 |
| From Seg.16 × 12 × c + 1 to Seg.16 × 13 × c | D2 |
| From Seg.16 × 13 × c + 1 to Seg.16 × 14 × c | C2 |
| From Seg.16 × 14 × c + 1 to Seg.16 × 15 × c | B2 |
| From Seg.16 × 15 × c + 1 to Seg.16 × 16 × c | A2 |

Next, after the printing medium is conveyed by 64×c pixels, a third printing scan S103 is carried out. In the third printing scan S103, the random mask (MASK A to MASK D) is applied to the printing elements (ejection heaters), by applying from the starting points (bits) in the following manner:

| | |
|---|---|
| From Seg.16 × 4 × c + 1 to Seg.16 × 5 × c | B1 |
| From Seg.16 × 5 × c + 1 to Seg.16 × 6 × c | A1 |
| From Seg.16 × 6 × c + 1 to Seg.16 × 7 × c | D1 |
| From Seg.16 × 7 × c + 1 to Seg.16 × 8 × c | C1 |
| From Seg.16 × 8 × c + 1 to Seg.16 × 9 × c | A2 |
| From Seg.16 × 9 × c + 1 to Seg.16 × 10 × c | D2 |
| From Seg.16 × 10 × c + 1 to Seg.16 × 11 × c | C2 |
| From Seg.16 × 11 × c + 1 to Seg.16 × 16 × c | B2 |
| From Seg.16 × 12 × c + 1 to Seg.16 × 13 × c | D3 |
| From Seg.16 × 13 × c + 1 to Seg.16 × 14 × c | C3 |
| From Seg.16 × 14 × c + 1 to Seg.16 × 15 × c | B3 |
| From Seg.16 × 15 × c + 1 to Seg.16 × 16 × c | A3 |

Next, after the printing medium is conveyed by 64×c pixels, a fourth printing scan S104 is carried out.

In the fourth printing scan S104, the random mask (MASK A to MASK D) is applied to the printing elements (ejection heaters), by applying from the starting points (bits) in the following manner:

| | |
|---|---|
| From Seg. 1 to Seg.16 × 1 × c | C1 |
| From Seg.16 × 1 × c + 1 to Seg.16 × 2 × c | B1 |
| From Seg.16 × 2 × c + 1 to Seg.16 × 3 × c | A1 |
| From Seg.16 × 3 × c + 1 to Seg.16 × 4 × c | D1 |
| From Seg.16 × 4 × c + 1 to Seg.16 × 5 × c | B2 |
| From Seg.16 × 5 × c + 1 to Seg.16 × 6 × c | A2 |
| From Seg.16 × 6 × c + 1 to Seg.16 × 7 × c | D2 |
| From Seg.16 × 7 × c + 1 to Seg.16 × 8 × c | C2 |
| From Seg.16 × 8 × c + 1 to Seg.16 × 9 × c | A3 |
| From Seg.16 × 9 × c + 1 to Seg.16 × 10 × c | D3 |
| From Seg.16 × 10 × c + 1 to Seg.16 × 11 × c | C3 |
| From Seg.16 × 11 × c + 1 to Seg.16 × 16 × c | B3 |
| From Seg.16 × 12 × c + 1 to Seg.16 × 13 × c | D4 |
| From Seg.16 × 13 × c + 1 to Seg.16 × 14 × c | C4 |
| From Seg.16 × 14 × c + 1 to Seg.16 × 15 × c | B4 |
| From Seg.16 × 15 × c + 1 to Seg.16 × 16 × c | A4 |

When the printing scan S104 has finished, since four printing scans has been completed in each of the four sections in PRINTING AREA 1 using the random mask starting from A1, B1, C1 and D1, the image printing in this area is completed.

Also, the printing elements are divided into groups, each containing 16×c elements, to which is applied the random mask containing four mask areas (MASK A to MASK D) complementary to each other. That is, in the divided four sections, the mask area is shifted by 16000 pixels in every 16×c printing elements in the horizontal direction. Since the printing elements are simultaneously driven at a period of 16 pixels, the number simultaneously driven in the respective divided four sections is at most ¼. Accordingly, the number of elements simultaneously driven is also ¼ as a whole.

Regarding the printing scan S105 to S109 shown in the drawing and those subsequent thereto, the same procedure is carried out, wherein in either of the printing scan, the number of elements simultaneously driven is at most ¼ of the total number due to the relationship between the printing elements and the random mask applied to the drive thereof.

According to this embodiment, the starting point may not be fixed in the respective printing area but may be optionally set. By randomly setting the management number for defining this starting point, it is possible to eliminate the generation of periodic pattern which is problematic when the random mask is applied.

(Other Embodiments)

In the above embodiment, since the number of printing elements is 16×16×c, the printing elements are divided into 16×c (=N) groups if 16 printing elements are grouped into one group. Accordingly, a drive period of one group is synchronized with a period of the simultaneous drive of the printing elements. That is, since it is possible to drive a series of 16 printing elements divisionally in the period of the simultaneous drive of the printing elements, it is possible to apply four combinations of the four mask areas complementary to each other during the control of the printing operation wherein the image printing is completed by repeating the printing scan four times in a certain printing area.

In another embodiment of the present invention, contrary to the above-mentioned embodiment, a printing head having 16×8×M printing elements (M is an odd number 1 or more) is used.

Figure 9:
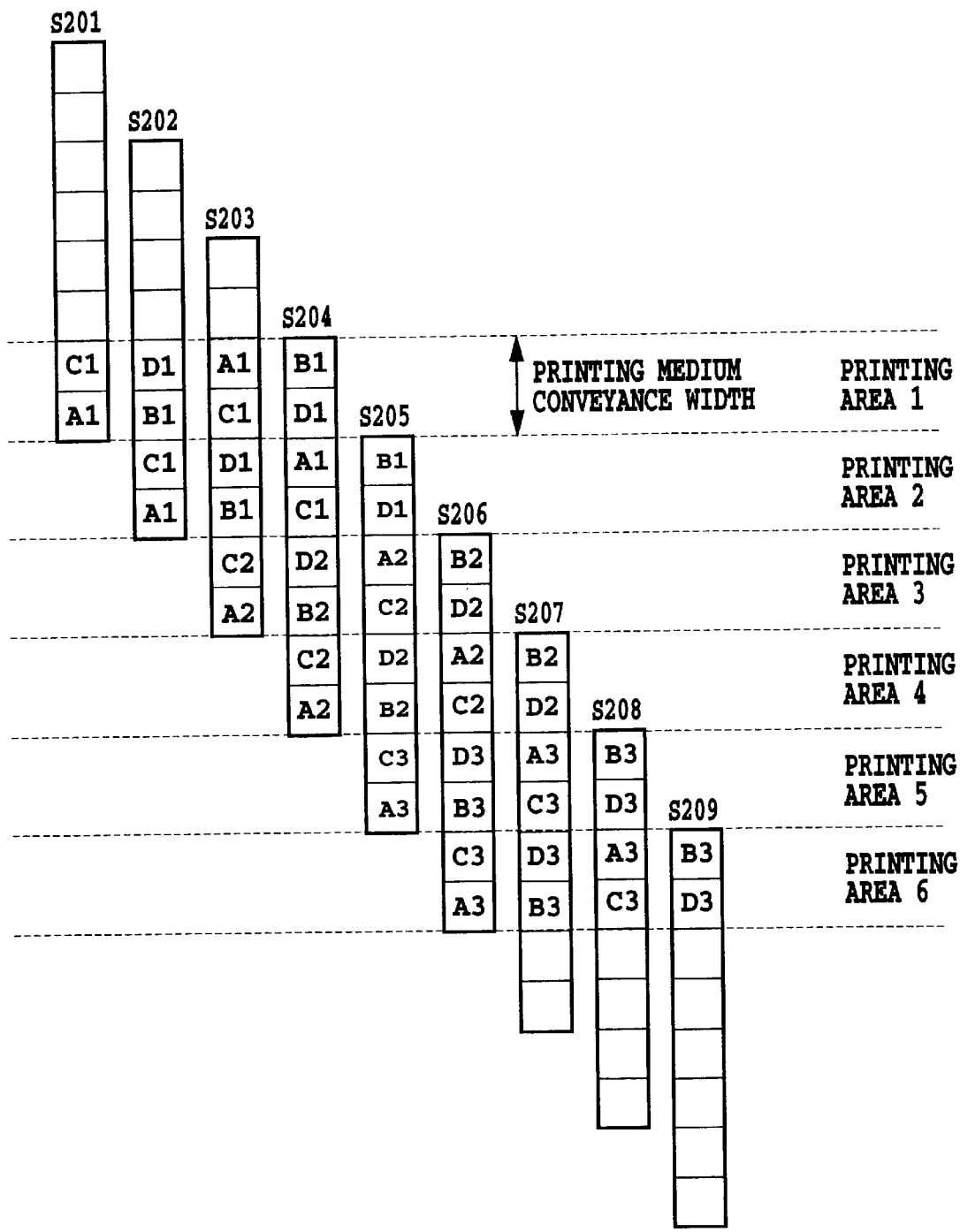
FIG. 9 illustrates the scanning operation of the printing head in a printing area and mask patterns used therefor in another embodiment of the present invention.

FIG. 9 illustrates a scanning operation of a printing head and a random mask applied thereto in a printing area in another embodiment of the present invention.

In a first printing scan S201, the printing head carries out the printing operation in PRINTING AREA 1 by using the printing elements corresponding to 64×M pixels from Seg.16×6×M+1 to Seg.16×8×M on the upstream side as seen in the conveyance direction of the printing medium. In this printing scan S201, PRINTING AREA 1 divided into two sections as seen in the sub-scanning direction, in each of which sections an starting point in the random mask is managed. As illustrated, the random mask is applied to the printing elements (ejection heaters), by applying from the starting points (bits) in the following manner:

| | |
|---|---|
| From Seg.16 × 6 × M + 1 to Seg.16 × 7 × M | C1 |
| From Seg.16 × 7 × M + 1 to Seg.16 × 8 × M | A1 |

Next, after the printing medium is conveyed, a second printing scan S202 is carried out. In the second printing scan S202, the random mask is applied to the printing elements (ejection heaters), by applying from the starting points (bits) in the following manner:

| | |
|---|---|
| From Seg.16 × 4 × M + 1 to Seg.16 × 5 × M | D1 |
| From Seg.16 × 5 × M + 1 to Seg.16 × 6 × M | B1 |
| From Seg.16 × 6 × M + 1 to Seg.16 × 7 × M | C1 |
| From Seg.16 × 7 × M + 1 to Seg.16 × 8 × M | A1 |

Next, after a printing medium is conveyed, the third printing scan S203 is carried out. In the third printing scan S203, the random mask is applied to the printing elements (ejection heaters), by applying from the starting points (bits) in the following manner:

| | |
|---|---|
| From Seg.16 × 2 × M + 1 to Seg.16 × 3 × M | A1 |
| From Seg.16 × 3 × M + 1 to Seg.16 × 4 × M | C1 |
| From Seg.16 × 4 × M + 1 to Seg.16 × 5 × M | D1 |
| From Seg.16 × 5 × M + 1 to Seg.16 × 6 × M | B1 |
| From Seg.16 × 6 × M + 1 to Seg.16 × 7 × M | C2 |
| From Seg.16 × 7 × M + 1 to Seg.16 × 8 × M | A2 |

Next, after the printing medium is conveyed, a fourth printing scan S204 is carried out. In the fourth printing scan S204, the random mask is applied to the printing elements (ejection heaters), by applying from the starting points (bits) in the following manner:

| | |
|---|---|
| From Seg. 1 to Seg.16 × 1 × M | B1 |
| From Seg.16 × 1 × M + 1 to Seg.16 × 2 × M | D1 |
| From Seg.16 × 2 × M + 1 to Seg.16 × 3 × M | A1 |
| From Seg.16 × 3 × M + 1 to Seg.16 × 4 × M | C1 |
| From Seg.16 × 4 × M + 1 to Seg.16 × 5 × M | D2 |
| From Seg.16 × 5 × M + 1 to Seg.16 × 6 × M | B2 |
| From Seg.16 × 6 × M + 1 to Seg.16 × 7 × M | C2 |
| From Seg.16 × 7 × M + 1 to Seg.16 × 8 × M | A2 |

When the printing scan S204 has finished, since four printing scans has been completed in each of the two sections in PRINTING AREA 1 using the random mask starting from A1, B1, C1 and D1, the image printing in this area is completed.

Also, since the printing elements are divided into two groups, to which is applied the mask random containing four mask areas (MASK A to MASK D) complementary to each other, the number of simultaneously driven printing elements is at most ¼.

The present invention is similarly applicable not only to the printing operation in which the image printing is completed by the printing scan repeated four times in the same printing area as described above, but also to that in which the image printing is completed by the printing scan repeated any number of times.

Figure 10:
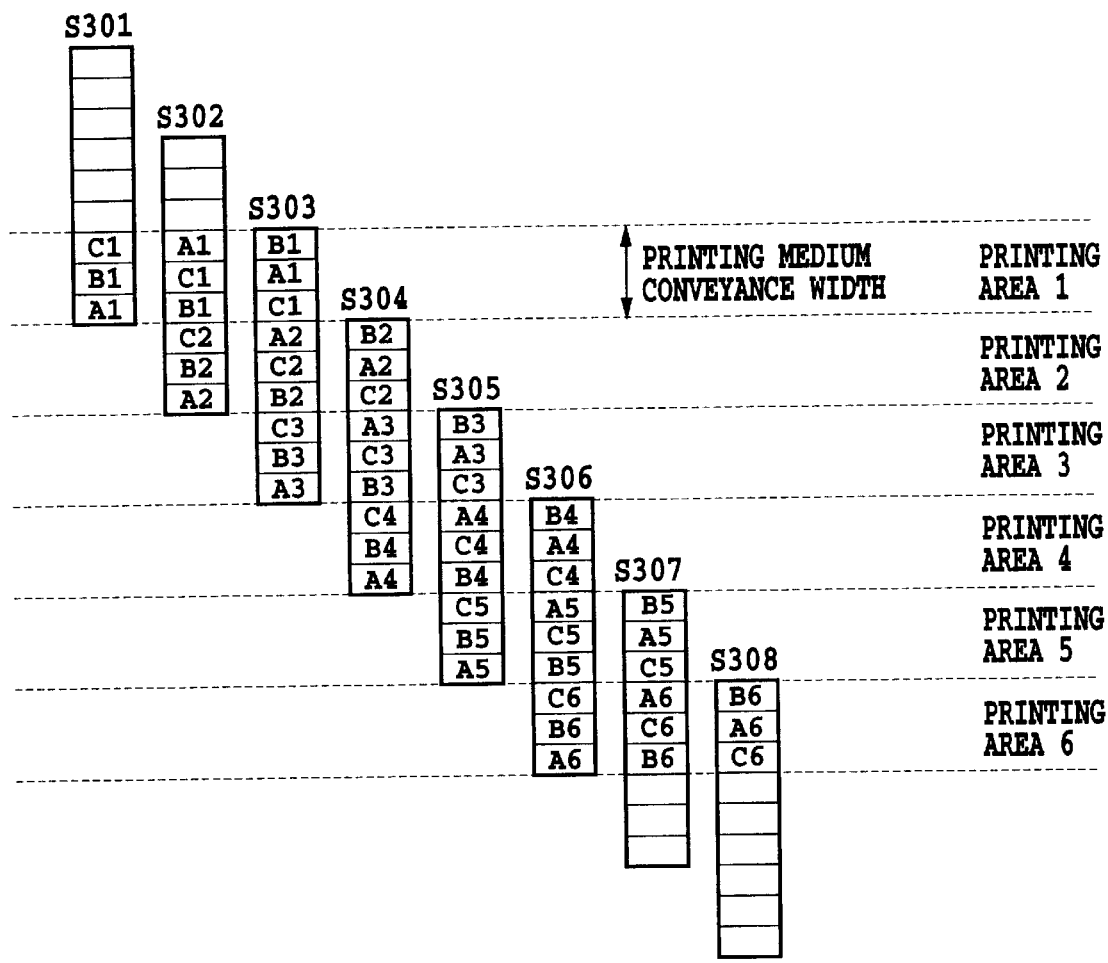
FIG. 10 illustrates the scanning operation of the printing head in a printing area and mask patterns used therefor in a further embodiment of the present invention.

FIG. 10 illustrates a scanning operation of a printing head and a random mask applied thereto in a printing area in a further embodiment of the present invention wherein the image printing is completed by the printing scan repeated three times in the same printing area.

The random mask used in this embodiment has three mask areas; A, B and C; which are complementary to each other so that the image is completed when these are used. The number of printing elements of a printing heads is 16×9×c (N=9×c). Also in this case, by applying the three mask areas, the similar control with the above is carried out in the printing scan S301, S302 . . . in the three sections, whereby it is possible to reduce the number of printing elements simultaneously driven to ⅓.

Figure 11:
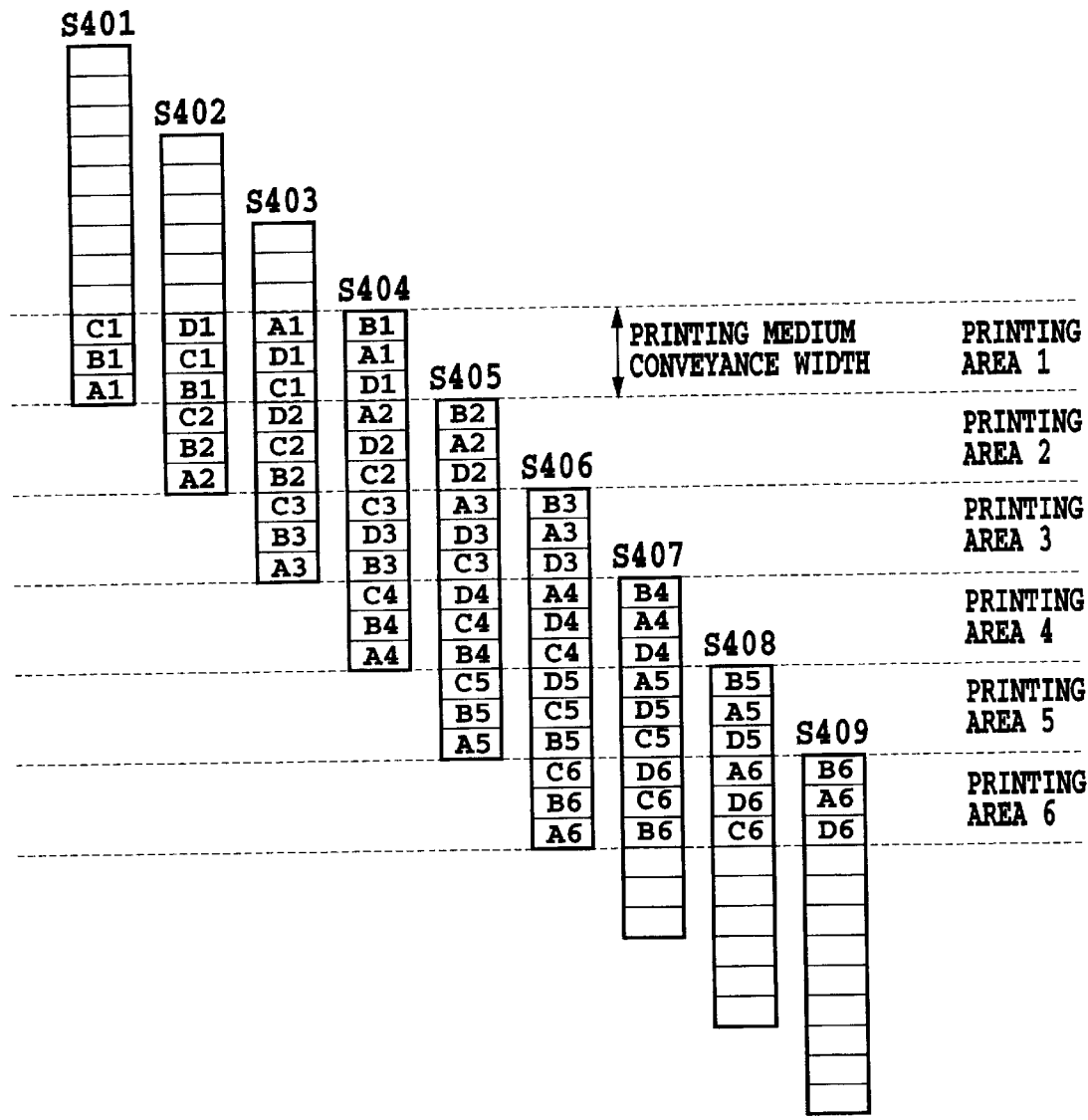
FIG. 11 illustrates the scanning operation of the printing head in a printing area and mask patterns used therefor in a furthermore embodiment of the present invention.

FIG. 11 illustrates a scanning operation of a printing head and a random mask applied thereto in a printing area in a furthermore embodiment of the present invention.

According to this embodiment, the printing heads has 16×4×L (L is an odd number 3 or more) printing elements, and the image printing is completed by repeating the printing scan four times in the same printing area. Also in this case, the similar control with the above is carried out in the printing scan S401, S402 . . . in the three sections, whereby it is possible to reduce the number of printing elements simultaneously driven to ⅓.

The number of the printing elements, the number of repetition of the printing scan, the number of mask areas complementary to each other and the number of sections in the respective printing area may be optionally selectable.

While the printing elements arranged in one column are used in the respective embodiments described above, the same effect is obtainable even if the printing elements arranged in a plurality of columns is used, by applying the random mask having mask areas complementary to each other to the printing elements simultaneously driven. Also, the similar structure may be possible even if the printing elements simultaneously driven correspond to a plurality of colors.

Further, the present invention may be applicable not only to the ink jet printing head having printing elements including electro-thermal transducers but also to that having printing elements including electromechanical transducers such as piezoelectric transducers, if there is a problem of increase in instantaneous drive current which may occur during the multi-path printing using a random mask. Of course, the present invention may be applicable to other type printing heads such as a thermal transfer type or a thermal sublimation type.

As described above, according to the present invention, in the printing system in which the image printing is completed by repeating the printing scan a plurality of times in the same printing area while applying the random mask, since the random mask having mask areas complementary to each other is applied to simultaneously driven printing elements, it is possible to restrict the instantaneously flowing current by limiting the maximum number of simultaneously driven printing elements.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus using a printing head on which a plurality of printing elements are arranged, scanning said printing head in a direction different from the arranging direction of said plurality of printing elements relative to a printing medium, and forming an image on a same printing area on said printing medium by a plural times of the scans of said printing head, said apparatus comprising:
   means for providing thinning patterns for said plural times of said scan, said thinning patterns being for determining whether or not each of the printing elements concerned with a printing operation in the same printing area is to be driven, and said thinning patterns being complementary to each other, and
   means for applying said thinning patterns complementary to each other in relation to the printing elements which are simultaneously driven when said printing operation is carried out in the same printing area.

2. A printing apparatus as claimed in claim 1, wherein said thinning pattern is a mask of a predetermined size in which data for determining whether or not the printing element is to be driven are arranged randomly.

3. A printing apparatus as claimed in claim 1, further comprising means for relatively conveying said printing medium in a direction perpendicular to the scanning direction between said scans by an amount less than the arrangement width of the plurality of printing elements.

4. A printing apparatus as claimed in claim 1, wherein the printing elements concerned with the printing operation carried out in the same printing area are used while being divided into a plurality of sections, and said applying means applies the thinning patterns to the plurality of sections during each of the plural times of said scans, and applies said thinning patterns complementary to each other to the respective sections during said plural times of the scans.

5. A printing apparatus as claimed in claim 1, wherein said printing head is a head for performing printing by ejecting an ink.

6. A printing apparatus as claimed in claim 5, wherein said printing head has heating elements for generating thermal energy to make the ink to film-boil, as an energy for ejecting the ink.

7. A printing method using a printing head on which a plurality of printing elements are arranged, scanning said printing head in a direction different from the arranging direction of said plurality of printing elements relative to a printing medium, and forming an image on the same printing area on said printing medium by a plural times of the scans of said printing head, said method comprising the steps of:

providing thinning patterns for said plural times of said scan, said thinning patterns for determining whether or not each of the printing elements concerned with a printing operation in the same printing area is to be driven, and said thinning patterns being complementary to each other, and applying said thinning patterns complementary to each other in relation to the printing elements which are simultaneously driven when said printing operation is carried out in the same printing area.

8. A printing method as claimed in claim 7, wherein said thinning pattern is a mask of a predetermined size in which data for determining whether or not the printing element is to be driven are arranged randomly.

9. A printing method as claimed in claim 7, further comprising a step of relatively conveying said printing medium in a direction perpendicular to the scanning direction between said scans by an amount less than the arrangement width of the plurality of printing elements.

10. A printing method as claimed in claim 7, wherein the printing elements concerned with the printing operation carried out in the same printing area are used while being divided into a plurality of sections, and said applying step applies the thinning patterns to the plurality of sections during each of the plural times of said scans, and applies said thinning patterns complementary to each other to the respective sections during said plural times of the scans.

11. A printing method as claimed in claim 7, wherein said printing head is a head for performing printing by ejecting an ink.

12. A printing method as claimed in claim 11, wherein said printing head has heating elements for generating thermal energy to make the ink to film-boil, as an energy for ejecting the ink.

* * * * *

UNITED STATES PATENT AND TRADEMARK OFFICE
CERTIFICATE OF CORRECTION

PATENT NO. : 6,626,517 B2
DATED : September 30, 2003
INVENTOR(S) : Osamu Iwasaki et al.

It is certified that error appears in the above-identified patent and that said Letters Patent is hereby corrected as shown below:

Column 2,
Line 44, "or" should be deleted.

Column 3,
Line 2, "represent to form" should read -- represents forming --.
Line 3, "irrespective" should read -- irrespective of --.
Lines 8 and 17, "to" should be deleted.
Line 19, "an" should be deleted.
Line 55, "furthermore" should read -- further --.

Column 4,
Line 37, "cases," should read -- case --.
Line 38, "has" should read -- is --.

Column 9,
Line 13, "coordinate" should read -- coordinates --.

Column 11,
Line 9, "to Seg.16 x 16 x c B1" should read -- to Seg. 16 x 12 x c B1 --.
Line 28, "to Seg. 16 x 12 x c B2" should read -- to Seg. 16 x 12 x c B2 --.
Line 52, "to Seg. 16 x 16 x c B3" should read -- to Seg. 16 x 12 x c B3 --.

Column 13,
Line 67, "furthermore" should read -- further --.

UNITED STATES PATENT AND TRADEMARK OFFICE
CERTIFICATE OF CORRECTION

PATENT NO. : 6,626,517 B2
DATED : September 30, 2003
INVENTOR(S) : Osamu Iwasaki et al.

It is certified that error appears in the above-identified patent and that said Letters Patent is hereby corrected as shown below:

<u>Column 14,</u>
Line 1, "has" should read -- have --.

Signed and Sealed this

Sixteenth Day of March, 2004

JON W. DUDAS
*Acting Director of the United States Patent and Trademark Office*